(12) United States Patent
Koseoglu (10) Patent No.: US 11,571,672 B2
(45) Date of Patent: Feb. 7, 2023

(54) METHOD OF PROVIDING CATALYSTS FOR A FLUIDIZED BED REACTOR

(71) Applicant: Saudi Arabian Oil Company, Dhahran (SA)

(72) Inventor: Omer Refa Koseoglu, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 313 days.

(21) Appl. No.: 16/694,153

(22) Filed: Nov. 25, 2019

(65) Prior Publication Data
US 2021/0154636 A1 May 27, 2021

(51) Int. Cl.
| | | |
|---|---|---|
| B01J 8/18 | (2006.01) | |
| B01J 8/00 | (2006.01) | |
| B01J 8/32 | (2006.01) | |
| B01J 8/44 | (2006.01) | |
| G01N 31/10 | (2006.01) | |

(52) U.S. Cl.
CPC ............ B01J 8/1872 (2013.01); B01J 8/008 (2013.01); B01J 8/32 (2013.01); B01J 8/44 (2013.01); G01N 31/10 (2013.01); B01J 2208/00814 (2013.01); B01J 2208/00884 (2013.01)

(58) Field of Classification Search
CPC ... B01J 8/1872; B01J 8/008; B01J 8/32; B01J 8/44; B01J 2208/00814; B01J 2208/00884; B01J 8/22; G01N 31/10
See application file for complete search history.

(56) References Cited

U.S. PATENT DOCUMENTS

| | | | | |
|---|---|---|---|---|
| 4,443,559 A | * | 4/1984 | Smith, Jr. | ............. B01D 3/009 203/DIG. 6 |
| D768,844 S | | 10/2016 | Koseoglu et al. | |
| 9,463,427 B1 | | 10/2016 | Koseoglu et al. | |
| 2008/0009408 A1 | * | 1/2008 | Birke | ..................... B01J 35/108 502/107 |
| 2014/0290061 A1 | * | 10/2014 | Siedler | .................. B01J 8/0214 29/890 |

FOREIGN PATENT DOCUMENTS

| | | | |
|---|---|---|---|
| CN | 201423275 Y | * | 3/2010 |
| CN | 103861530 A | | 3/2014 |

(Continued)

OTHER PUBLICATIONS

Taber et al (Grubbs' Catalyst in Paraffin: An Air-Stable Preparation for Alkene Metathesis, JOC Note, 2003, vol. 68, pp. 6047-6048) (Year: 2003).*

(Continued)

*Primary Examiner* — Benjamin R Whatley
*Assistant Examiner* — Jean Caraballo-Leon
(74) *Attorney, Agent, or Firm* — Leason Ellis LLP (57) ABSTRACT

A method for testing catalysts in a fluidized bed reactor comprises enclosing catalyst material in capsules having pores or holes smaller than the catalyst material, inserting the capsules filled with catalyst material to into a port of the fluidized bed reactor and recovering at least a portion of the catalyst capsules from the fluidized bed reactor after use through an additional port of the fluidized bed reactor, wherein the capsules move with a flow of uplifted fluid and gas in the fluidized bed reactor.

15 Claims, 10 Drawing Sheets

(56) References Cited

FOREIGN PATENT DOCUMENTS

| CN | 201423275 Y | 6/2014 | |
|---|---|---|---|
| WO | 012607 A1 | 4/2001 | |
| WO | WO-2018152521 A1 * | 8/2018 | ............. C10G 53/14 |

OTHER PUBLICATIONS

González-Cortés et al. (Wax: A benign hydrogen-storage material that rapidly releases H2-rich gases through microwave assisted catalytic decomposition, Nature Scientific Reports, 2016, 11 pages) (Year: 2016).*
Eccles, Richard M. "Residue hydroprocessing using ebullated-bed reactors." Fuel processing technology 35.1-2 (1993): 21-38.
Weissman, J. G et al.,. "Characterization and aging of hydrotreating catalysts exposed to industrial processing conditions." Applied Catalysis A: General 142.2 (1996): 289-314.
International Search Report and Written Opinion in Corresponding PCT Application No. PCT/US2020/062028 dated Mar. 17, 2021. 13 pages.

* cited by examiner

METHOD OF PROVIDING CATALYSTS FOR A FLUIDIZED BED REACTOR

FIELD OF THE DISCLOSURE

The present disclosure relates to chemical processing, and more particularly relates to a method for catalyst testing in fluidized bed reactors using catalyst capsules.

BACKGROUND OF THE DISCLOSURE

Figure 1:
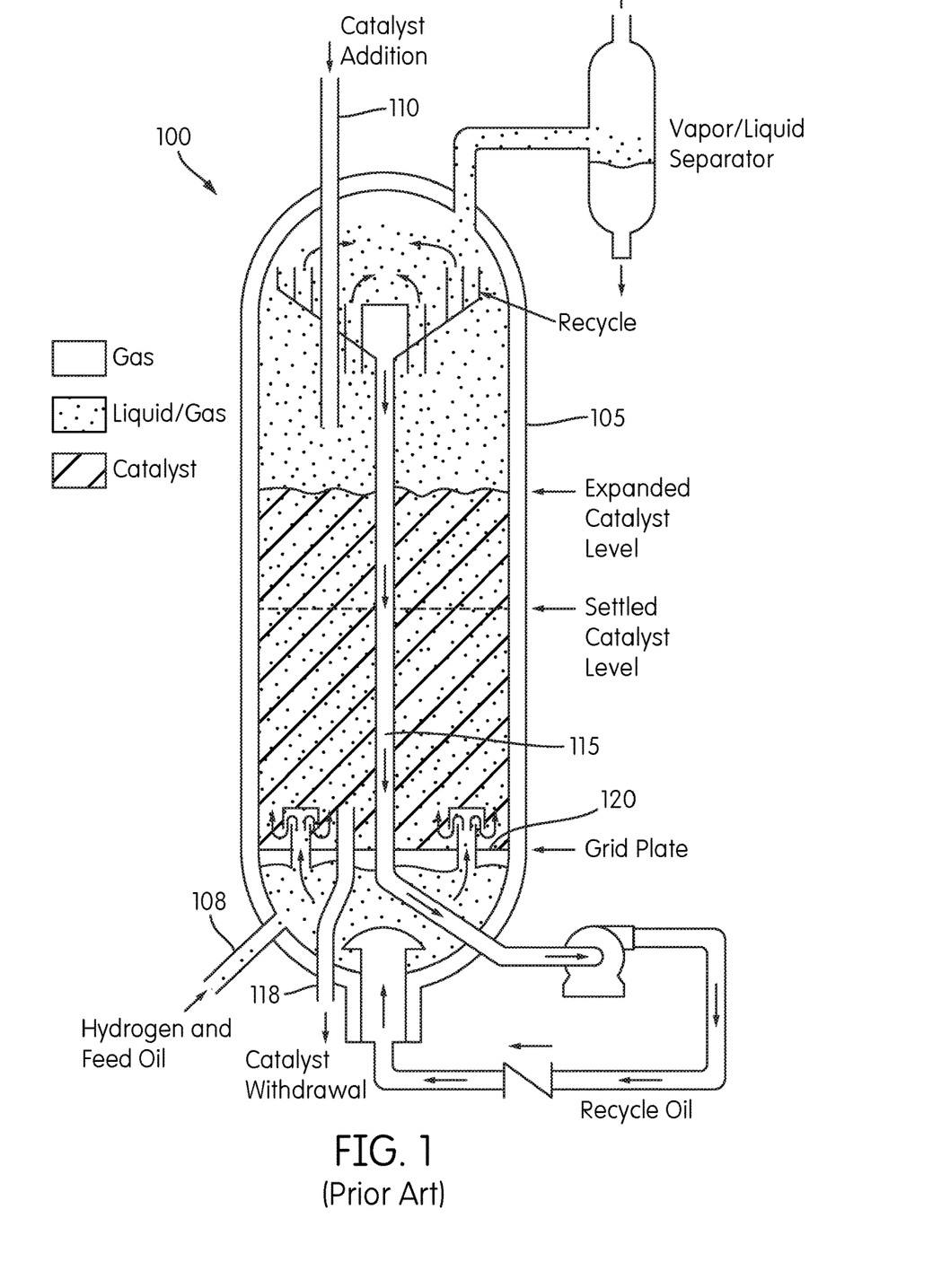
FIG. 1 is a cross-sectional view of an ebullated-bed reactor according to the prior art.

Ebullated-bed reactors are one of the types of reactors currently used in hydrocracking of heavy oils and other chemical processing. The ebullated-bed reactor is a fluidized-bed three phase system in which back-mixing of both the reactor liquid composition and the catalyst particles occurs. The catalysts used in the ebullated-bed reactor are kept in a fluidized state through the upward lift of liquid reactants and gas (feed oil plus recycled products) which enter the reactor and are distributed across the bed through a distributor and grid plate. Fresh catalyst can be added and spent catalyst withdrawn to control the level of catalyst activity in the reactor. FIG. 1 is a cross-sectional view of an exemplary ebullated-bed reactor (as known in the art). As shown, the ebullated-bed reactor 100 includes a generally cylindrical housing 105 with a feedstock port 108 arranged at the bottom of the housing and a catalyst feed port 110 arranged at the top. Feedstock (e.g., oil) is recycled through a recycling path 115 and catalyst can be withdrawn and recovered from the bottom of the reactor via a withdrawal port 118. A grid plate 120 is positioned near the bottom of the reactor. The level indicators in FIG. 1 show that the catalyst input to the reactor mixes with the liquids and gases in the reactor and expands from a "settled catalyst level" to an "expanded catalyst level" in the reactor through uplift.

Ebullated-bed reactors have several advantages over fixed-bed reactors: the ebullating bed does not get plugged by solids present in some heavy feeds; the liquid recycle provides a high magnitude of mixing within the reactor, thus ensuring that temperature gradients are minimized; and catalysts can be added and withdrawn continuously, allowing long operating runs without shutting down the reactor. The catalyst pellets should be small enough to facilitate suspension by the liquid phase in the reactor. The rate of catalyst addition and withdrawal is set in order to maintain constant conversion. It is noted that slurry-bed reactors have similar advantages to the aforementioned advantages of ebullated-bed reactors.

Catalyst testing containers for fixed reactor beds are not designed optimally for ebullated-bed reactors. For example, catalyst baskets described in commonly-assigned U.S. Pat. No. 9,802,173 (by the present inventor) are designed to be loaded with large amounts of catalysts, on the order of 100 cubic centimeters to 10 liters, and for use at a fixed location in a fixed-bed reactor. Such catalyst baskets cannot be applied in reactors in which catalysts are mobile and are replaced daily.

SUMMARY OF THE DISCLOSURE

What is therefore needed is a method of providing catalyst materials in fluidized bed reactors for testing procedures in which a plurality of different catalysts can be tested simultaneously.

The present disclosure provides a method for testing catalysts in a fluidized bed reactor. The method comprises enclosing catalyst material inside capsules having pores or holes smaller than the catalyst material, inserting the capsules filled with catalyst material to into a port of the fluidized bed reactor, and recovering at least a portion of the capsules from the fluidized bed reactor after use through an additional port of the fluidized bed reactor, wherein the capsules move with a flow of uplifted fluid and gas in the fluidized bed reactor. The method can be implemented in ebullated-bed reactors and slurry-bed reactors.

In some embodiments, the capsule includes a housing made of two separable sections, connectable via a hinge. The capsule can also be connectable by a threaded surface or a snap-fit feature. The housing can be made from a wire mesh material and include a rim having a hinge. The housing of the capsule can alternatively be formed from a metal sheet including an arrangement of holes. In certain embodiments, the housing of the capsule is formed from a grid of wires.

The capsules can be formed in a variety of shapes. For example, in some embodiments, the capsule is spherical in shape. In other embodiments, the capsule is cylindrical or rectangular in shape.

The pores or holes are a salient feature of the capsules as they determine the rate at which the catalyst material within the capsules interacts with the fluid feedstock within the reactor; smaller holes or pores yield a lower reaction rate. However, pores cannot be so large as to allow unreacted catalyst material to escape from the capsules. The diameter of the pores or holes is 50 percent or less than the smallest dimension of the catalyst material.

In most fluidized bed reactors, the catalyst capsules are added to a port positioned at a top section of the reactor and the catalyst capsules are recovered at a port positioned at a bottom section of the reactor.

Some embodiments of the method further comprise fixing the catalyst material inside the capsules using a fixing material. In some implementations, the fixing material comprises paraffin.

These and other aspects, features, and advantages can be appreciated from the following description of certain embodiments and the accompanying drawing figures and claims.

DETAILED DESCRIPTION OF CERTAIN EMBODIMENTS OF THE DISCLOSURE

The present disclosure provides a method of testing catalysts in fluidized bed reactors, such as mobile-bed, ebullated-bed, and slurry-bed reactors, using catalyst capsules. Embodiments of the catalyst capsule comprise casings with small holes that are used to house catalyst particles in fluidized-bed reactors. The capsules are made of high-temperature resistant material such as stainless-steel mesh and can have a variety of form factors. The linear dimensions of the capsules are in a range of 0.5 to 3 cm in the particular embodiments described herein. The mesh or hole sizes can be half the size or smaller than the catalyst grains, which typically range from ¼ inch down to 1/32 of an inch in diameter. In ebullated-bed reactors, the catalyst capsules are entrained within the moving fluid through upward lift of liquid reactants and gas. Fresh catalyst capsules can be added and spent catalyst in the capsules can be withdrawn to control the level of catalyst activity in the reactor. The capsules can be added and collected from the reactor after completion of a preset duration. Used capsules can be recycled for further testing procedures.

Figure 2A:
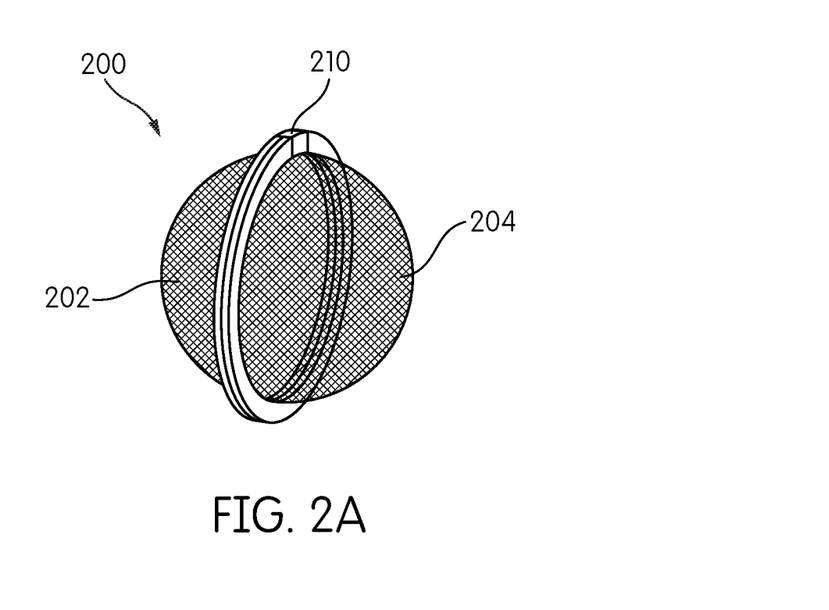
FIG. 2A is a perspective view of a spherical catalyst capsule according to the present disclosure in a closed state.
Figure 2B:
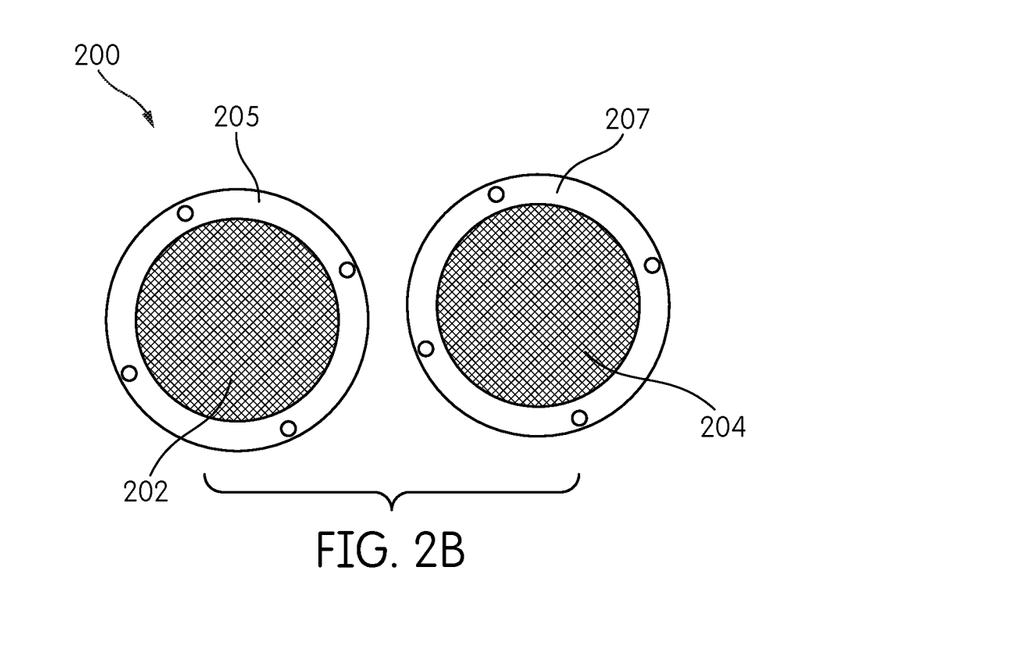
FIG. 2B is a view of the spherical catalyst shown in FIG. 2A in an opened state.
Figure 2C:
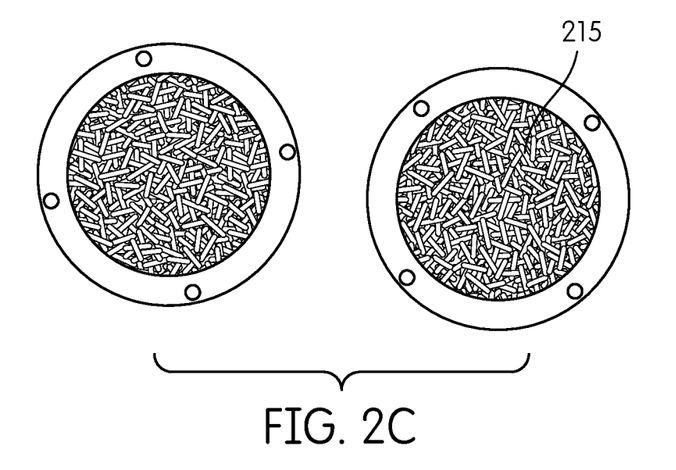
FIG. 2C is a view of the open spherical catalyst shown in FIG. 2A filled with catalyst material.
Figure 2D:
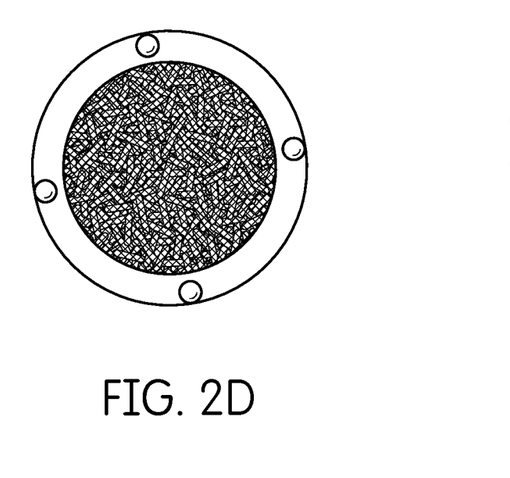
FIG. 2D is a front view of the spherical catalyst in a closed state filled with catalyst material.
Figure 2E:
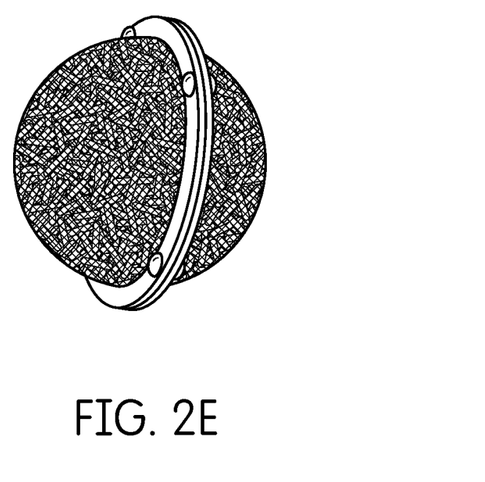
FIG. 2E is a side view of the spherical catalyst in a closed state filled with catalyst material.

The capsules of the present disclosure can take a variety of forms. FIGS. 2A to 2E show a first embodiment of a catalyst capsule according to the present disclosure, having a spherical shape and composed of wire mesh. As shown in the figures, the capsule 200 includes two hemispheres 202, 204. The curved portion of the hemisphere 202 is largely composed of mesh and has a metallic rim 205. Hemisphere 204 is similarly largely composed of mesh and has a corresponding metallic rim 207. The mesh is intended to be permeable to gases and liquids and to retain undissolved solid catalyst material. The rims 205, 207 are coupled via a hinge 210 allowing the capsule to be opened for loading of catalyst material. The hinge 210 can also be disengaged to separate the hemispheric sections 202, 204. FIG. 2A shows the capsule 200 in a closed state without catalyst material; FIG. 2B shows the capsule with hemispheres 202, 204 separated; FIG. 2C shows the separate hemispheric sections loaded with catalyst material 215. FIGS. 2D and 2E show front and side view of the capsule in a closed state with loaded catalyst. The catalyst material can also have a variety of sizes and forms including spherical, cylindrical, lobed, honey-comb shapes. The catalyst material used in connection with certain embodiments of the disclosure can be engineered to have pores and voids to promote reactivity.

The dimensions of the capsule 200 vary depending on the application and size of catalysts. The diameter, length and depth of the capsule 200 ranges from about 0.5 cm to about 10 cm. The catalyst grains range from about 0.03 inches to about 0.25 inches. The holes in the hemispherical mesh 202, 204 to be used with the present method are to be half the size or smaller than the smallest dimension of the catalyst grains to ensure that grains do not escape through the mesh of the capsule. The mesh can be made from stainless steel. In some embodiments, rather than a mesh, the capsules contain wire structures, which can be made from metallic materials. High temperature silicon and ceramic material composites can also be used.

Figure 3A:
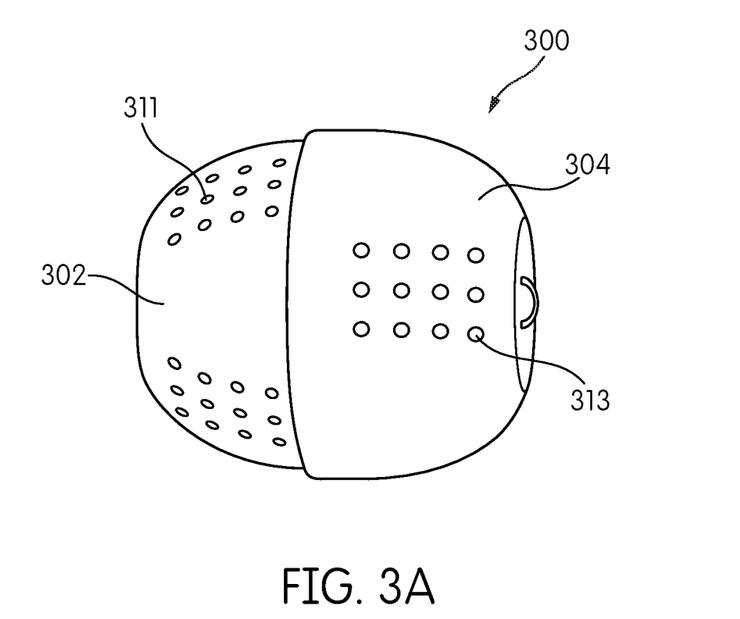
FIG. 3A is a side view of another embodiment of a catalyst capsule according to the present disclosure having a solid (non-mesh) housing.
Figure 3B:
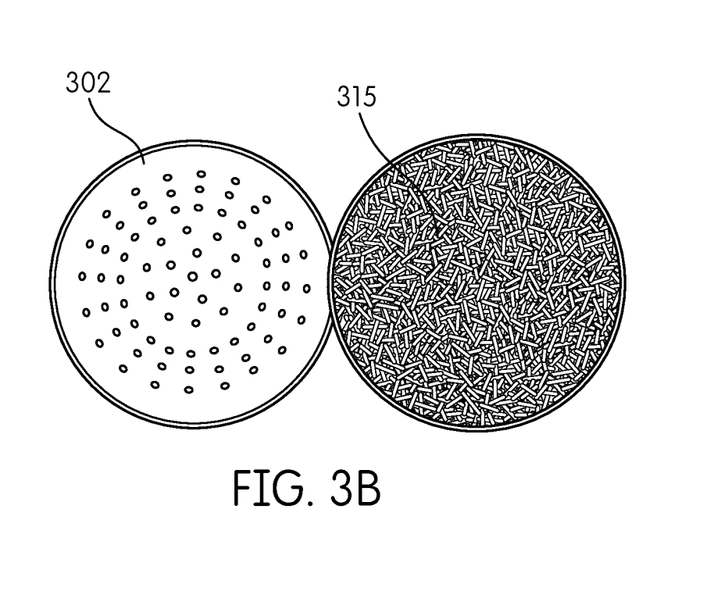
FIG. 3B shows the two sections of the catalyst capsule of FIG. 3A separated.
Figure 3C:
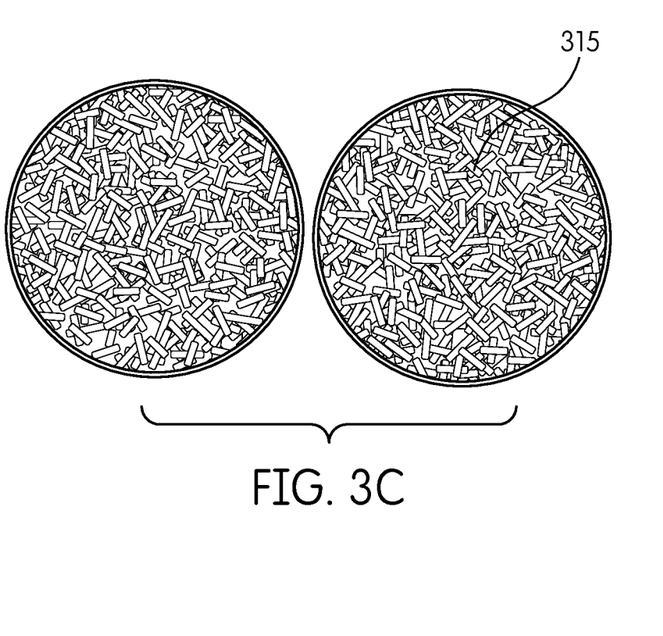
FIG. 3C shows both sections of the catalyst section as shown in FIG. 3B filled with catalyst material.
Figure 3D:
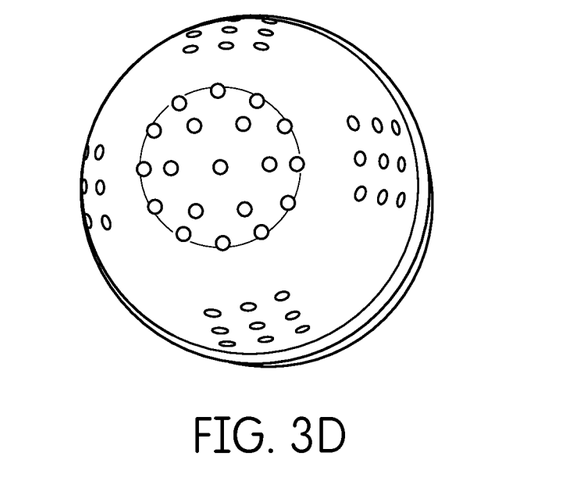
FIG. 3D is a top view of the catalyst capsule of FIGS. 3A-3C in a closed state.

FIGS. 3A to 3D depict another embodiment of a catalyst capsule according to the present disclosure. As shown in FIG. 3A, the capsule 300 is substantially spherical or ellipsoid in shape and comprises a solid sheet (in other words, non-mesh) housing comprised of two sections 302, 304 with arrangements of holes e.g., 311, 313 on the housing surface. In some implementations, the holes in the arrangements are spaced apart from each other by about 1 to 6 millimeters. As shown in FIG. 3B, the two sections 302, 304 of the housing are shown separated. The sections 302, 304 can be securely joined together through a threaded surface, snap-fit, detent or other fastening element. In FIG. 3B, a plan view of section 302 of the housing is shown on the left, and the inside of section 304, filled with catalyst grains 315, is shown on the right. FIG. 3C shows the first and second separated sections 302, 304 of the housing filled with catalyst grains. FIG. 3D is a top view of capsule 300 in a closed state.

Figure 4A:
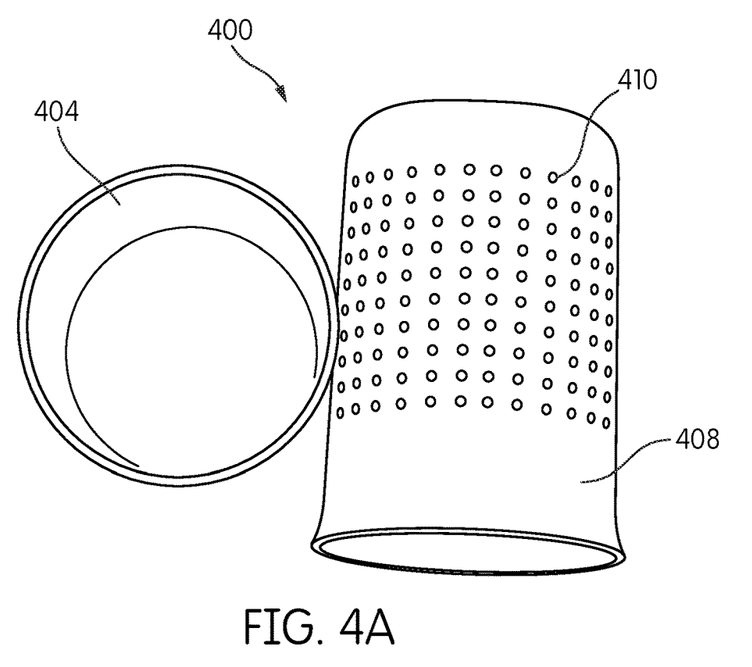
FIG. 4A is a view of a cylindrical catalyst capsule according to the present disclose shown with sections separated.
Figure 4B:
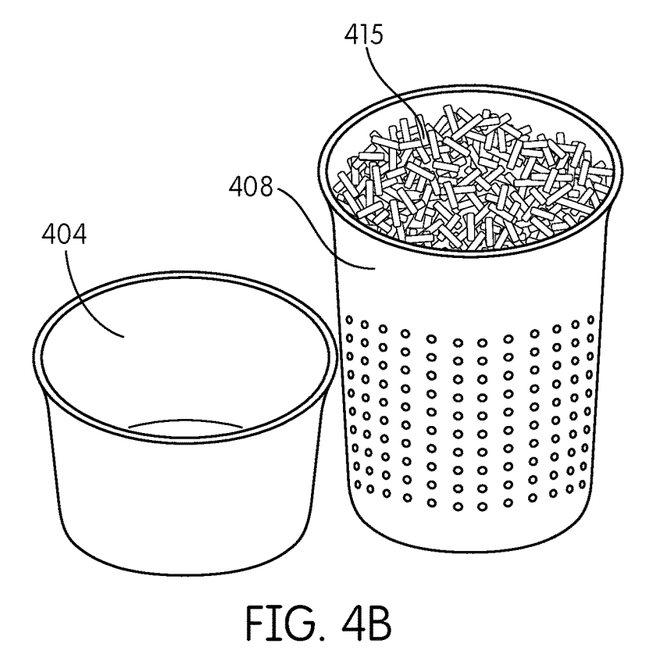
FIG. 4B shows the elongated section of the cylindrical catalyst capsule filled with catalyst material.
Figure 4C:
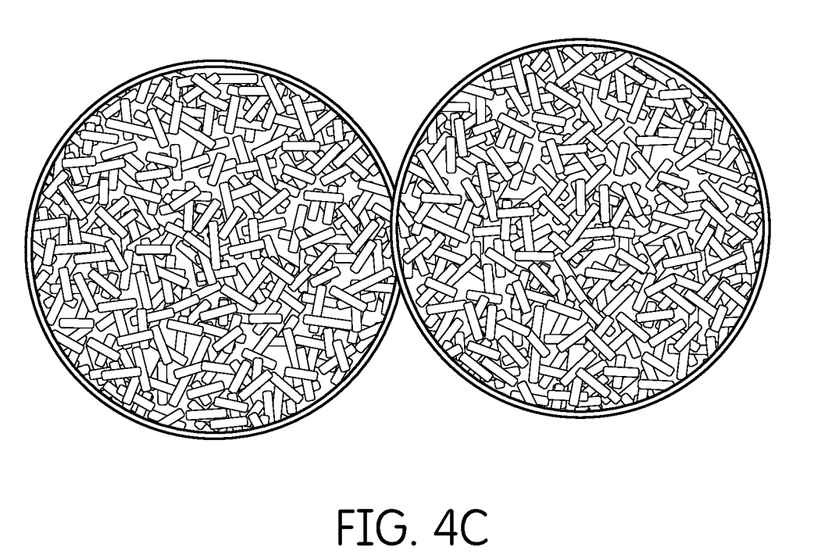
FIG. 4C is a top view showing both sections of the cylindrical catalyst capsule filled with catalyst material.

FIGS. 4A to 4C show another embodiment of capsule having a solid sheet metal housing in which the catalyst capsule is cylindrical in form. FIG. 4A shows the housing of the capsule 400 separated into first and second sections 404, 408, in which section 408 is elongated in comparison to section 404. The elongated section 408 is perforated with holes, e.g., 410 FIG. 4B shows the separated sections with the larger section 408 filled with catalyst material 415. FIG. 4C is a top view of sections 404, 408 with both sections filled with catalyst material.

Figure 5A:
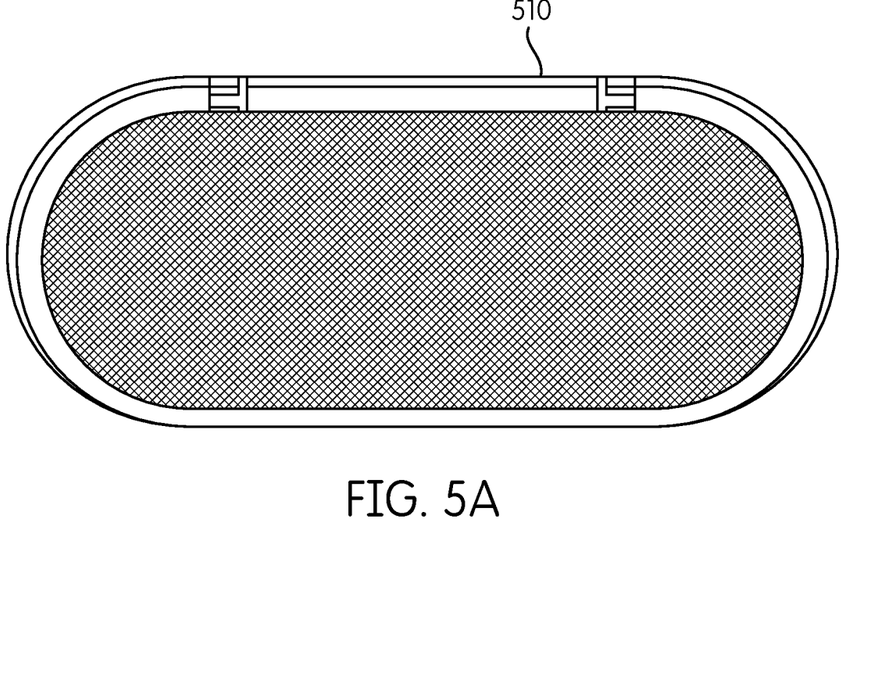
FIG. 5A is a side view of an ellipsoid catalyst capsule formed from a metal mesh.
Figure 5B:
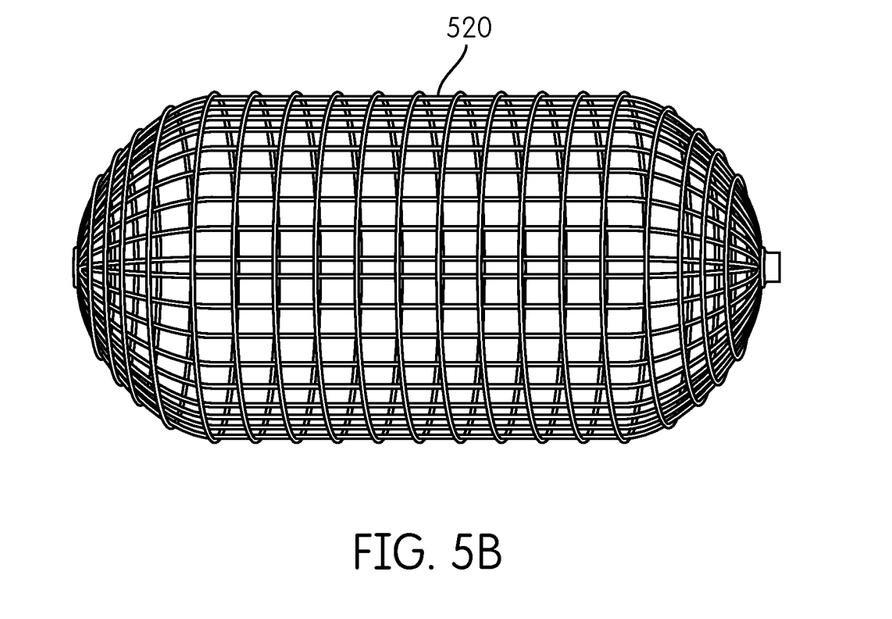
FIG. 5B is a side view of an ellipsoid formed from a three-dimensional grid of steel wires.
Figure 5C:
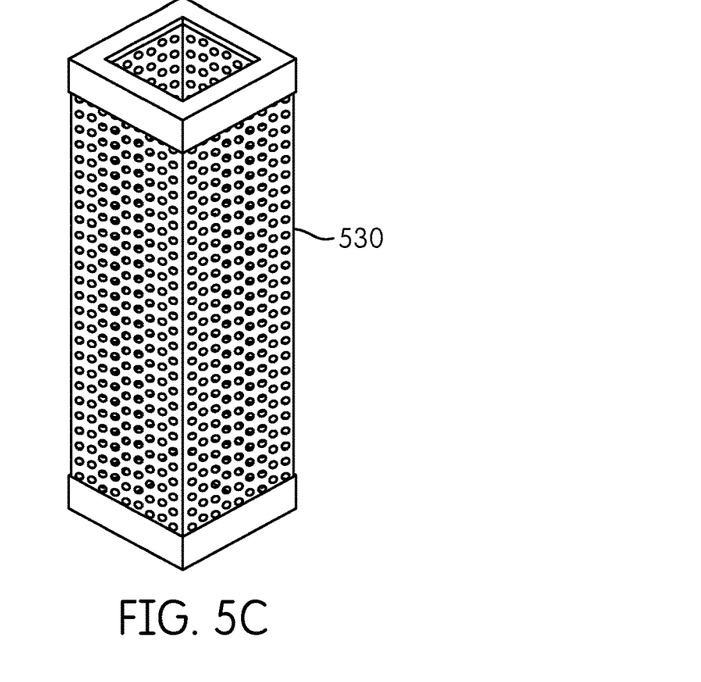
FIG. 5C is a perspective view of a rectangular catalyst capsule formed from a metal mesh.
Figure 5D:
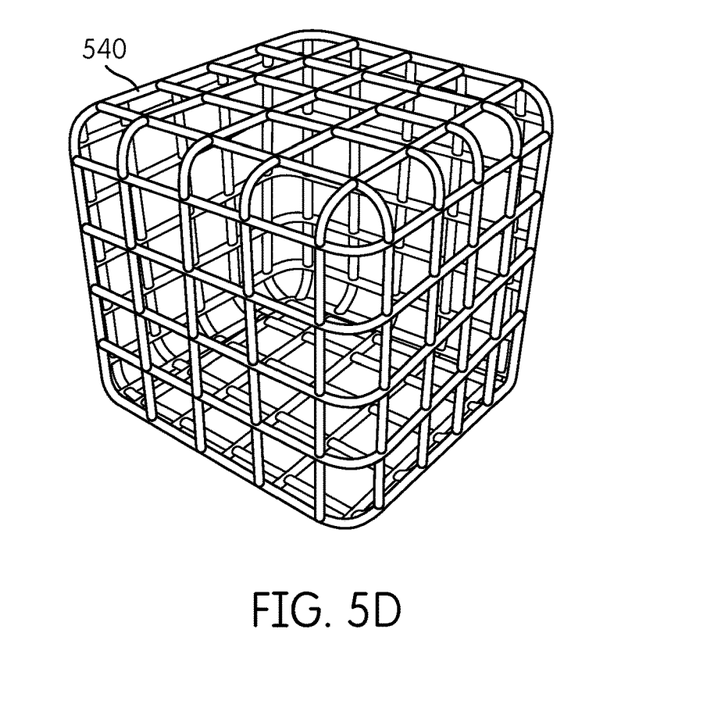
FIG. 5D is a perspective view of a rectangular catalyst capsule formed from a wire grid structure.

FIG. 5A is a side view of an ellipsoid catalyst capsule 510 formed from a metal mesh. FIG. 5B shows a similarly-shaped ellipsoid capsule 520 formed from a three-dimensional grid of steel wires. FIG. 5C is a perspective view of a rectangular catalyst capsule 530 formed from a metal mesh and FIG. 5D shows a contrasting perspective view of a rectangular catalyst capsule 540 formed from a wire grid structure. FIG. 5A to 5D, and the previous figures, illustrate how the different-shaped catalysts can be formed in different ways using meshes, wires and sheets of material.

In operation, catalyst capsules can be added to the reactor daily for a certain time period to ensure the required level of activity. After use, the capsules are recovered through a withdrawal port of the reactor. The recovered capsules can then be refilled with catalyst material and recycled back to the reactor.

Figure 6:
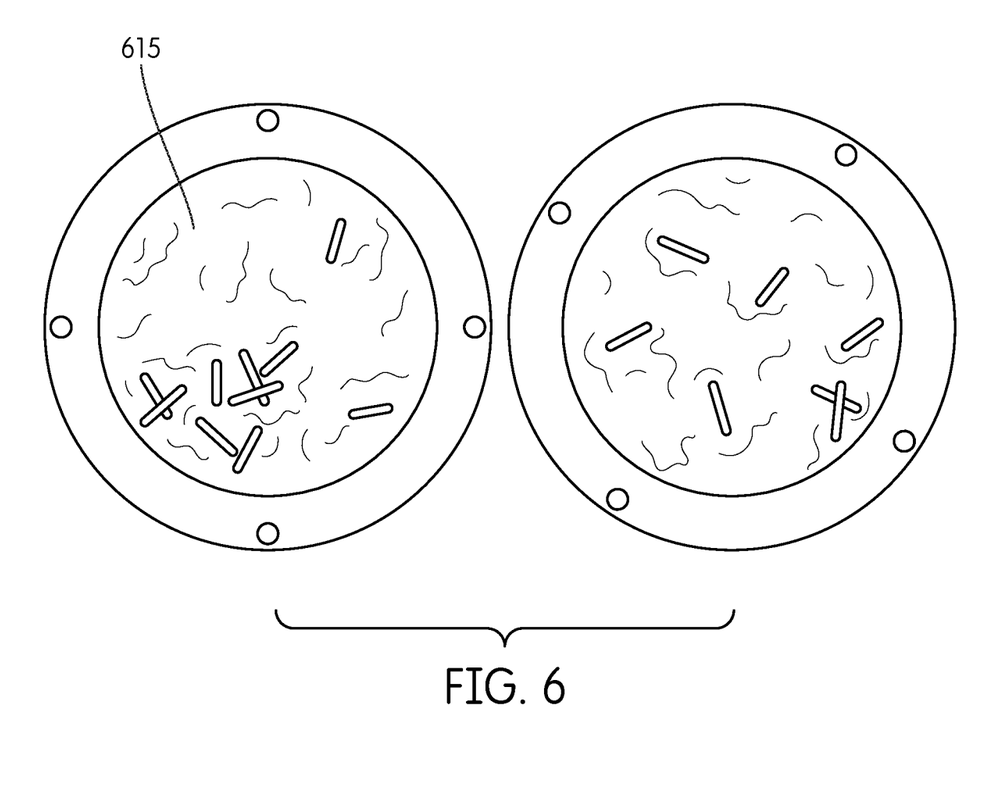
FIG. 6 shows an open catalyst capsule as shown in FIG. 2C including catalyst material that has been fixed in position.

When catalyst grains are loaded into the capsules, they can be left in their original condition with some space remaining in the capsules. In this case, the catalyst grains have some degree of mobility within the capsules. In other implementations, the catalyst material can be fixed in the capsule, for example using a paraffin fixing material. FIG. 6 shows separated capsule sections loaded with catalyst material 615 that has been fixed in this manner. Fixation of the catalyst material enables catalyst material to be layered in the capsule. In certain implementations, the catalysts can be layered based on activity of functionality. For example, a hydrodemetallization catalyst can be included as a first layer, with hydrodenitrogenation and hydrodesulfurization catalysts positioned in additional layers. The fixing material is thereafter removed within the reactor or prior to introduction into the reactor by washing with a solvent.

Ebullated-bed reactors typically operate at a temperature of 380-500 degrees Celsius, or more narrowly from 400 degrees to 440 degrees Celsius. The total pressure typically ranges between 50 and 200 bar, and more usually between 100 to 200 bar. The liquid hourly space velocity is about 0.1-4, or more preferably from 0.25-1.5 $h^{-1}$. The catalyst replacement rate (Kg/barrel of feed) can range from 0.1 to 10, and more typically from 0.3 to 2.5 Kg/bbl. The liquid superficial velocity of the reactor inlet generally ranges from 0.4 to 0.8 Meters/Second and the gas superficial velocity at the reactor inlet generally ranges from 4 to 8 Meters/Second.

The embodiments of catalyst capsules disclosed herein provide greater flexibility for catalyst testing in fluidized bed reactor systems. The capsules are small enough to become entrained and move with the gas and liquid flows in the reactor. The capsules can be designed in various shapes suited for particular catalysts and desired activity rates. Importantly, the capsules can be withdrawn from use in the reactor when the catalysts are expended or complete their targeted service time.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components or steps described and illustrated with reference to the figures are required for all embodiments or arrangements.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and "comprising", when used in this specification, specify the presence of stated features, integers, steps, operations, elements, or components, but do not preclude the presence or addition of one or more other features, integers, steps, operations, elements, components, or groups thereof.

Terms of orientation are used herein merely for purposes of convention and referencing and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting.

Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A method for providing catalysts for a fluidized bed reactor comprising:
    enclosing a catalyst material inside capsules having pores or holes smaller than the catalyst material;
    inserting the capsules filled with the catalyst material into a port of the fluidized bed reactor; and
    entraining the catalyst-filled capsules within a moving fluid through upward lift of liquid reactants and gas;
    recovering at least a portion of the capsules from the fluidized bed reactor after use through an additional port of the fluidized bed reactor,
    wherein the capsules move with the upward lift of liquid reactants and gas in the fluidized bed reactor.

2. The method of claim 1, wherein the fluidized bed reactor is an ebullated-bed reactor.

3. The method of claim 1, wherein the fluidized bed reactor is a slurry-bed reactor.

4. The method of claim 1, wherein the capsules include a housing made of two separable sections, connectable via a hinge.

5. The method of claim 4, wherein the housing has a surface made from a wire mesh material and a rim having a hinge.

6. The method of claim 1, wherein the capsules include a housing made of two separable sections, connectable via one of a threaded surface and a snap-fit feature.

7. The method of claim 4, wherein the housing of the capsules are formed from a metal sheet and includes an arrangement of holes.

8. The method of claim 4, wherein the housing of the capsules are formed from a grid of wires.

9. The method of claim 1, wherein the capsules are spherical in shape.

10. The method of claim 1, wherein the capsules are cylindrical in shape.

11. The method of claim 1, wherein the capsules are rectangular in shape.

12. The method of claim 1, wherein a diameter of the pores or holes is 50 percent or less than a smallest dimension of the catalyst material.

13. The method of claim 1, wherein the capsules are inserted into a port positioned at a top section of the fluidized bed reactor and the capsules are recovered at a port positioned at a bottom section of the fluidized bed reactor.

14. The method of claim 1, further comprising fixing the catalyst material inside the capsules using a fixing material.

15. The method of claim 14, wherein the fixing material comprises paraffin.

* * * * *